July 7, 1959  A. R. BUCHHOLZ ET AL  2,893,406
COIN CHANGER APPARATUS
Filed June 4, 1956
8 Sheets-Sheet 1

INVENTORS
Arnold R. Buchholz
Frank Haban
BY Searles & French
Attys.

July 7, 1959     A. R. BUCHHOLZ ET AL     2,893,406
COIN CHANGER APPARATUS Filed June 4, 1956     8 Sheets-Sheet 4

INVENTORS
Arnold R. Buchholz
Frank Haban
BY
Searles & French
Att'ys.

A. R. BUCHHOLZ ET AL 2,893,406

COIN CHANGER APPARATUS

Filed June 4, 1956

INVENTORS
Arnold R. Buchholz
Frank Haban
BY
Searles & French
Attys.

United States Patent Office 2,893,406
Patented July 7, 1959

2,893,406

COIN CHANGER APPARATUS

Arnold R. Buchholz and Frank Haban, Watertown, Wis., assignors to Brandt Automatic Cashier Company, Watertown, Wis., a corporation of Wisconsin Application June 4, 1956, Serial No. 589,235

4 Claims. (Cl. 133—2)

The invention relates to coin dispensing machines and more particularly to such machines using electrically controlled coin ejectors.

The main object of this invention is to provide a new and improved control keyboard and electrical devices controlled thereby for electrically controlled coin dispensing coin changers in which only nineteen keys are necessary for making change on a dollar basis and other special keys may be used for tenders of less than a dollar, such as seventy-five, fifty, and twenty-five cents. Since there are only nineteen keys for dispensing change on a dollar basis and all the transactions can be handled by pressing down on one or two of these keys and an operator can readily memorize the key positions, it has been found that with this type of keyboard change can be made faster than where a keyboard having 1 to 99 keys is used.

A further object of the invention is to provide an abbreviated keyboard of the type above described and electrical devices controlled thereby which, on a dollar tender basis, will dispense the smallest amount of coins to make up the change and will dispense the smallest amount of change for special tenders of less than a dollar.

A further object of the invention is to provide an abbreviated keyboard of the type above described and electrical devices controlled thereby which, in addition to dispensing change on a dollar tender basis, will also through special keys dispense split change for a quarter, a half dollar, and seventy-five cents.

A further object of the invention is to provide a coin changer dispensing machine in which the dispensing of coins from each channel of the machine is separately controlled by an electro-responsive device, which devices are normally active to dispense one dollar but which through the action of change keys and electrical devices controlled thereby are selectively rendered inactive, so the active devices will dispense the required change.

The invention further consists in the several features hereinafter described and more particularly defined by claims at the conclusion hereof.

Figure 1:
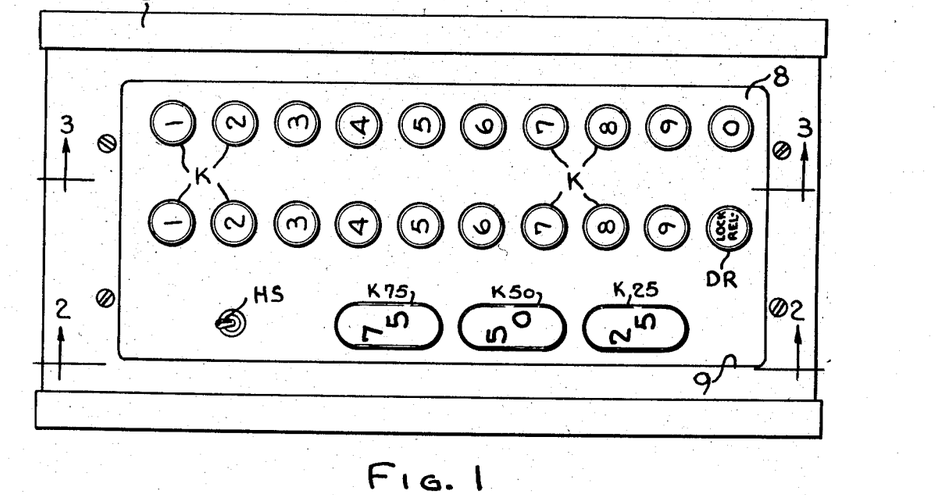
Fig. 1 is a plan view of a keyboard embodying the invention.
Figure 2:
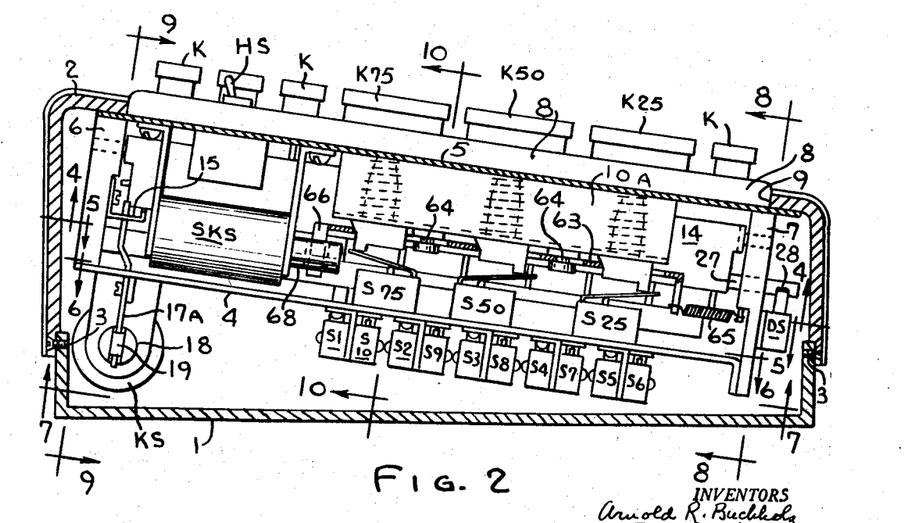
Fig. 2 is a detailed horizontal sectional view taken on the line 2—2 of Fig. 1.
Figure 3:
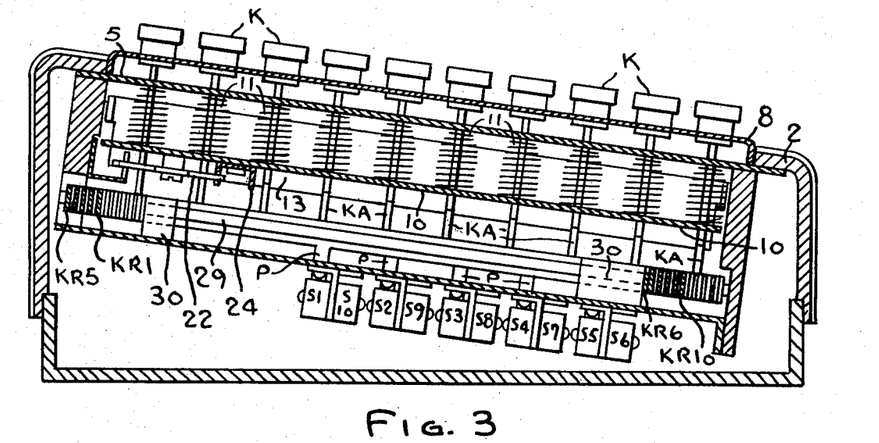
Fig. 3 is a detailed horizontal sectional view taken on the line 3—3 of Fig. 1.

Referring to Figs. 1 and 2, the keyboard includes an outer housing base section 1 and an outer housing top section 2, these parts being suitably connected together by screws 3, one being shown. Suspended from the inclined top of the housing is a metal base plate 4. A bridge type frame comprising a metal top plate 5 secured to spaced legs 6 and 7 has the base portions of its legs suitably connected by screws (not shown) to parts of the base plate 4. A cover plate 8 rests on the top plate 5 and projects through an opening 9 in the top of housing section 2. A plate 10 is suspended from the top plate 5.

Two rows of operator controlled keys K are vertically slidably mounted in slots in the plates 5 and 10, each key being normally urged to its upper position by a spring 11. Each key K has a specially formed foot or finger KA with one or more projections adapted when depressed to engage and press down on one or more of a series of levers or rockers KR1 to KR10 which act to close one or more switches hereinafter described. As shown in Fig. 1, the keys K are arranged in two rows, the lower row having tens keys numbered 1 to 9 and the upper row having digit keys 1 to 9 and a zero key. There is also a depletion release control key DR in the tens key row. Each key has a locking notch KB so that when any key in a row is depressed, it may be engaged and held down by a latch flange or finger 12 on a latch bar 13 or 14 pivotally mounted at its ends on the legs 6 and 7 of the frame, one of the bars 13 being disposed adjacent one side of the plate 10 for latching one row of keys K and the other bar 14 being disposed adjacent the other side of said plate for latching the other row of keys K. Each time a key in any row is depressed it will shift its associated latch bar to a release position so that only one key in a row is latched down at any one time.

Figure 4:
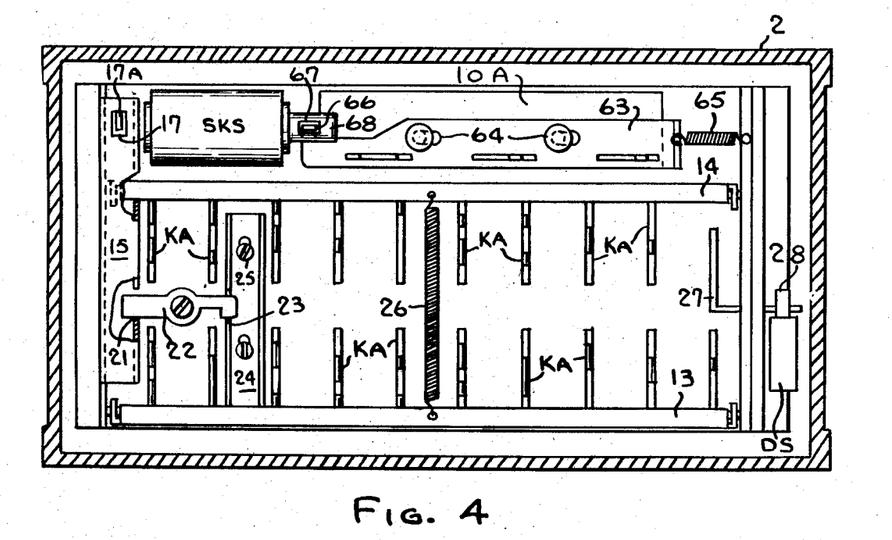
Fig. 4 is a detailed horizontal sectional view taken on the line 4—4 of Fig. 2, looking up.
Figure 5:
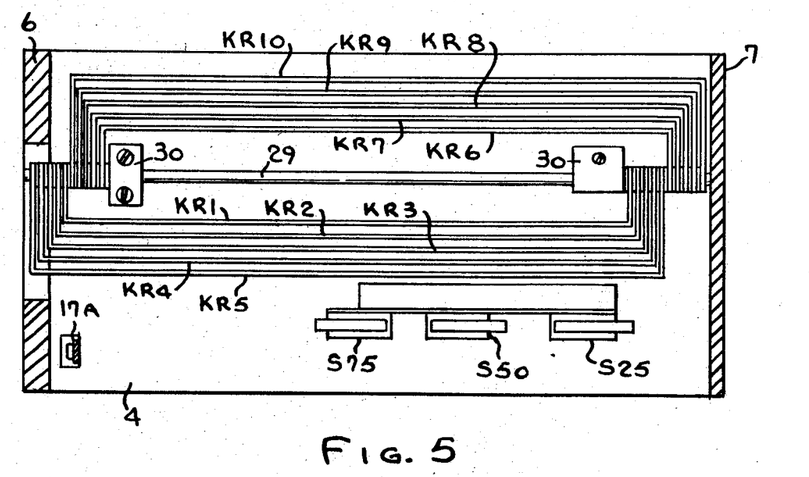
Fig. 5 is a detailed horizontal sectional view taken on the line 4—4 looking down.
Figure 9:
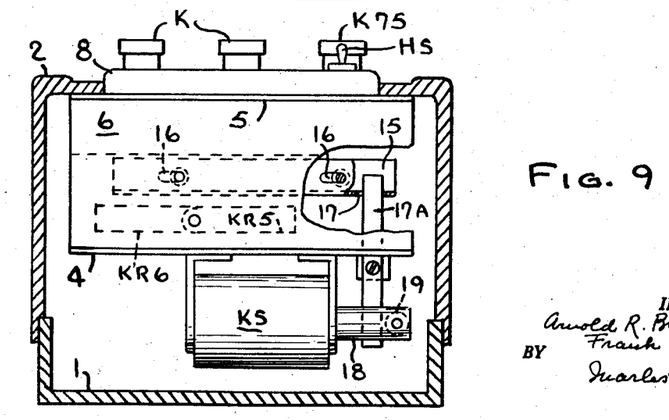
Fig. 9 is a detailed vertical sectional view taken on the line 9—9 of Fig. 2.
Figures 10, 11, 12:
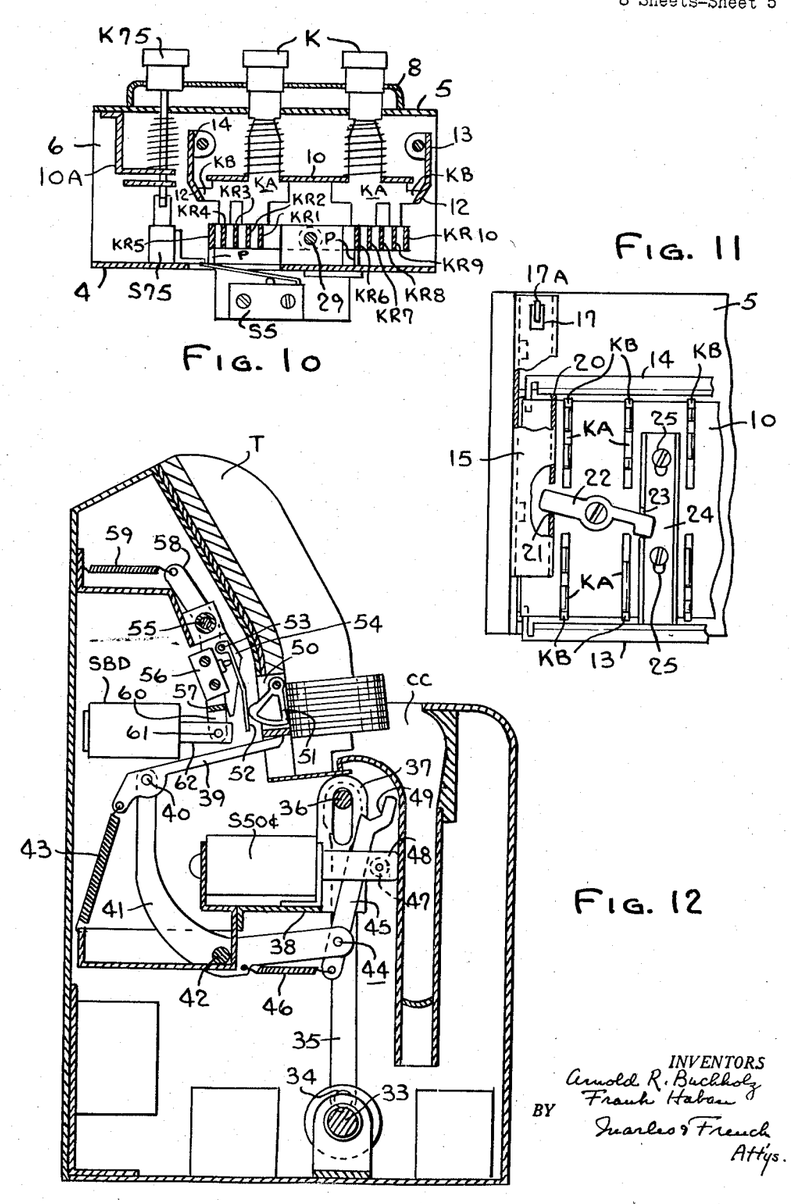
Fig. 10 is a detailed vertical sectional view taken on the line 10—10 of Fig. 2.
Fig. 11 is a detailed view similar to Fig. 4 showing certain of the parts in a different position.
Fig. 12 is a vertical sectional view through a coin dispensing apparatus that may be controlled by the keyboard.

Referring to Figs. 4, 9, and 11, a means for releasing the latch bars 13 and 14 after each cycle of operation of the machine includes an angled actuating bar 15 slidably mounted on the leg 6 by pin and slot connections 16 and provided with a slot 17 to receive the upper end of a medially pivotally supported lever 17A whose lower end extends through the slotted end of a plunger 18 of a key release solenoid KS and is adapted to engage a roller 19 on this plunger. The bar 15 has a slot 20 for engagement with one end of latch bar 14, and it has another slot 21 for engagement with one arm of a lever 22 medially pivotally mounted on the plate 10. The other arm of lever 22 is engageable with one side of a slot 23 in a channel bar 24 slidably mounted by means of pin and slot connections 25 on the plate 10 and adapted to engage the latch bar 13. The bars 13 and 14 are normally urged toward each other to a latching position by a spring 26. On energization of the solenoid KS the plunger 18 is retracted to swing the lever 17A to move the bar 15 upwardly as viewed in Fig. 4 to swing the latch bar 14 outwardly to a release position and at the same time swing the lever 22 so as to move the bar 24 downwardly as viewed in Fig. 4 to swing the latch bar 13 outwardly to a release position.

The spring released key DR has an angled foot 27, see Figs. 2 and 4, which on its downward movement engages the spring actuator arm 28 for the depletion release switch DS which as hereinafter described controls a solenoid.

Each of the rockers is a U-shaped metal bar whose legs are pivotally mounted on a shaft 29 mounted in bearing blocks 30 on the top of the base plate 4 and whose bridge portion has a downwardly disposed projection P at a predetermined position. There are two sets of rockers, one set being selectively operated by one row of the keys K and the other set being selectively operated by the other row of keys K, see Fig. 10. There are five rockers KR10, KR9, KR8, KR7, and KR6 controlled by the digit keys including the zero key and five rockers KR5, KR4, KR3, KR2, and KR1 controlled by the tens keys.

Figure 6:
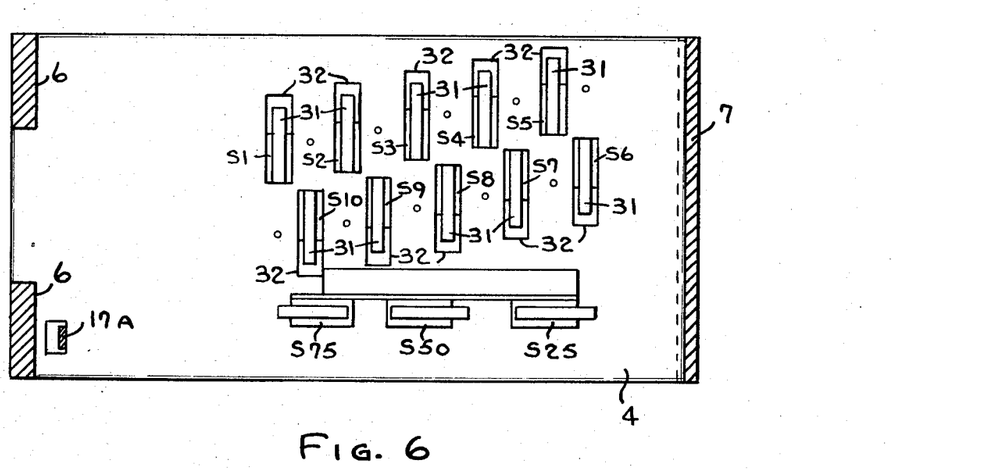
Fig. 6 is a detailed horizontal sectional view taken on the line 6—6 of Fig. 2.
Figure 7:
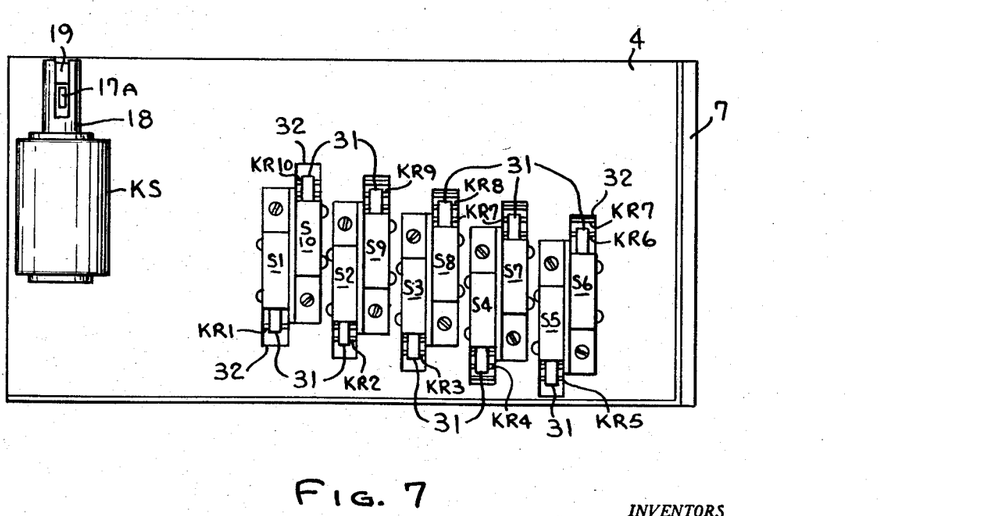
Fig. 7 is a detailed horizontal sectional view taken on the broken line 7—7 of Fig. 2.
Figure 8:
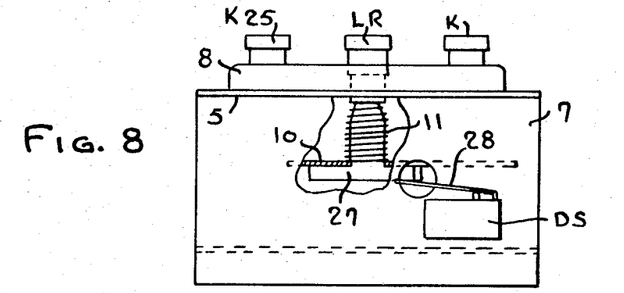
Fig. 8 is a detailed vertical sectional view taken on the line 8—8 of Fig. 2.

Referring to Figs. 6 and 7, switches S1 to S10 are mounted on the underside of the base plate 4 so that their spring arm actuators 31 project through slots 32 in said plate for engagement with the projections P of the rockers and acting on said rockers to hold said rockers in their upper position against the projection or projections KA of the keys, see Fig. 10, so that depression of any one of the keys K will act through the appropriate rocker or rockers to move one or more of the actuators 31 to close one or more of the switches S1 to S10.

Figure 13:
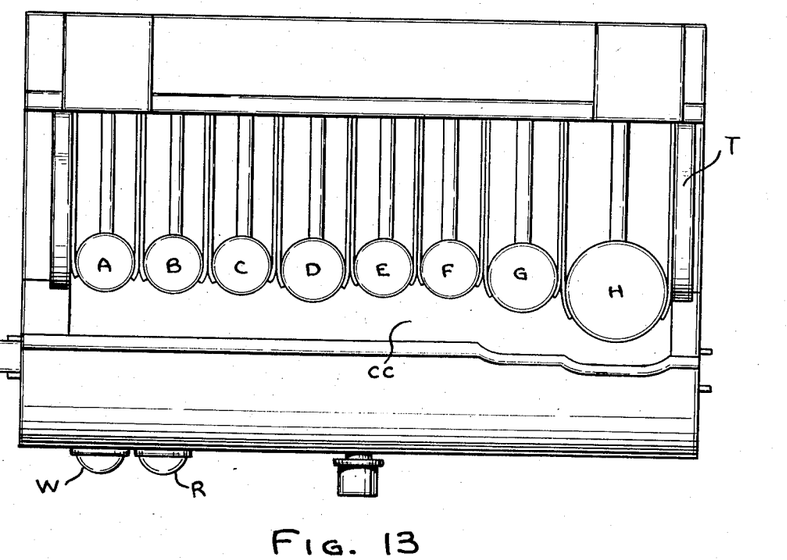
Fig. 13 is a top plan view of such apparatus.

As an example of an electrically controlled coin dispensing unit that may be controlled by the above described keyboard, reference may be had to our copending application Serial No. 546,679, filed Nov. 14, 1955, for Coin Dispensing Machine, but in order that the circuits controlled by the keyboard herein described may be understood parts of a coin dispensing unit are shown in Figs. 12 and 13 and will now be described.

The coin dispensing machine has a tray T having a series of coin channels A, B, C, D, E, F, G, and H. Channels A, B, and C take one cent coins, channel D a nickel, Channels E and F dimes, channel G quarters, and channel H half dollar. A power drive shaft 33 carries cranks 34 (one being indicated) operatively connected by links 35 (one being shown) to a cross bar 36 working in a pair of spaced brackets 37 (one being shown) mounted on a shelf 38.

A coin ejector mechanism is provided for each coin channel, the ejector mechanisms for the channels A, D, E, F, G, and H being adapted to eject one coin at a time and those for the channels B and C two coins at a time.

Figure 15:
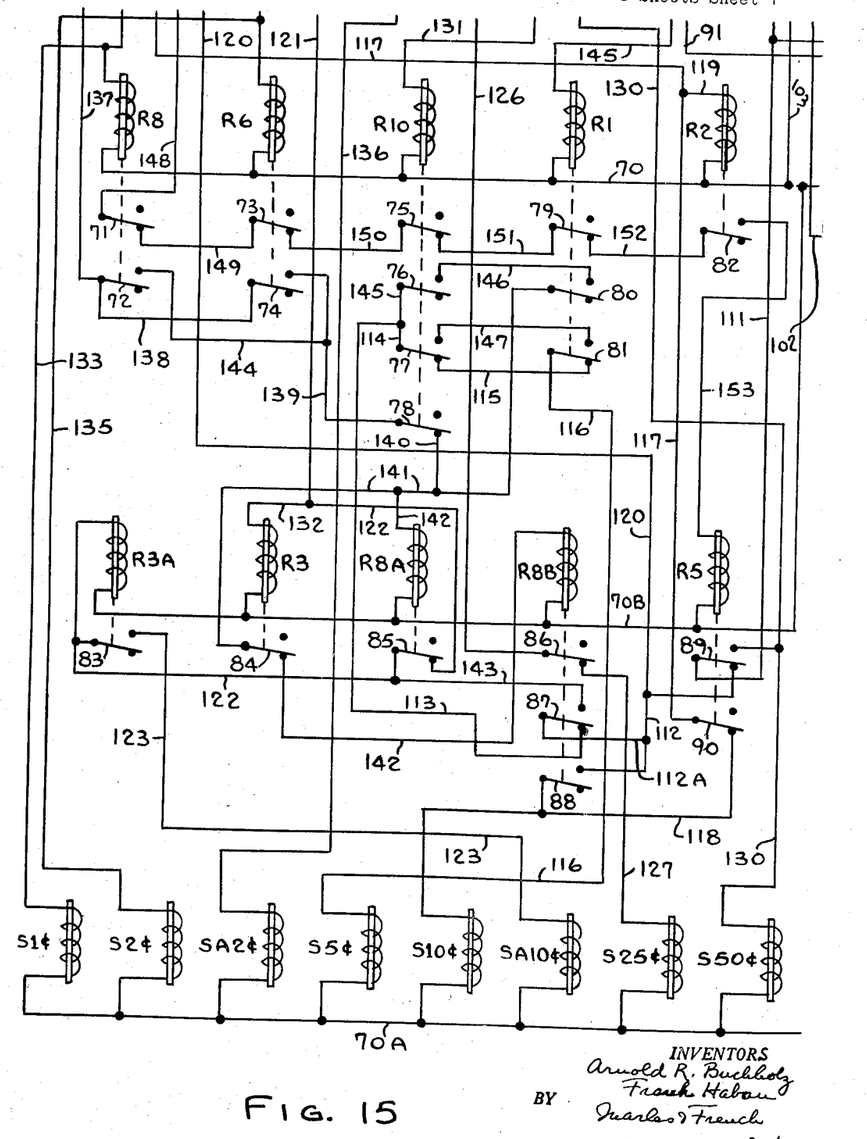
Fig. 15 is a lower continuation of the diagram of Fig. 14.

Each ejector merchanism includes a coin ejector finger 39 working through a slot in the coin tray and pivotally connected at 40 to the upper arm of an ejector lever 41 pivotally mounted intermediate its ends on a transversely extending shaft 42, said finger being normally urged upwardly by a spring 43 against the upper end of said slot. The lower arm of lever 41 is pivotally connected at 44 to a push bar or coupling member 45 which under the action of a spring 46 is normally urged against a roller 47 mounted in the front sloted end of a plunger 48 of a solenoid, the one shown being the solenoid S50¢. The ejector positioning solenoids are indicated in Fig. 15. Each push bar or coupling member 45 has a notch 49 at its upper end so that when its operating solenoid, such as S50¢, is energized, and its plunger 48 moved toward the left, the notched end of said bar will be alined with the cross bar 36 which on its downward movement pushes down on member 45 which then acts to swing the lever 41 clockwise about shaft 42 and with it the finger 39 to move said finger toward the right to eject the coin or coins from its channel so that it may fall into a chute structure CC by which it is carried out of the apparatus.

Referring to Fig. 12, each of the coin channels has a slot 50 and a coin engaging lever or finger 51 is pivotally mounted at its upper end to work in said slot. Each finger is yieldingly held against the stack of coins in its associated channel by a yieldable switch actuator 52 pivoted at 53 on a lever 54 pivotally mounted on a transversely disposed shaft 55. A switch, such as 56, is mounted on the lever 54 and normally held in an open position by its actuator 52. All of the levers 54 are normally held by the spring action of the actuators 52 against a stop bar 57 forming part of a swinging frame which is pivoted on the shaft 55 and has an arm portion 58 connected to a spring 59 secured at its other end to the housing.

The stop bar 57 has a projection 60 at one end connected by a pin 61 to the plunger 62 of a solenoid SBD. At the end of every payment the stop bar 57 is released from the levers 54 by the movement of plunger 62 by the solenoid SBD so that the actuators 52 are released from pressure engagement with the fingers 51 so that the coins in the stacks are free to drop down to bring the lower one or ones to a dispensing position. If, however, the coins in any one of the stacks should be depleted, then the actuator 52 of that stack will swing its finger inwardly of the stack and relieve its pressure on its switch, such as the switch 56, so that this swich is closed, and is hereinafer described, this acts to open the motor circuit to stop further operation of the apparatus.

The keyboard has the special spring returned split change keys K25, K50, and K75 mounted to extend through the plates 5 and 10 and on depression close switches S25, S50, and S75, respectively, see Figs. 1 and 2. These keys have locking notches, similar to the notches KB of the keys K, adapted to be engaged by a latch bar 63 slidably mounted by pin and slot connections 64 on the bottom of the plate 10A and normally movable to its latched position by a spring 65 and having a foot 66 engaging in a slot 67 in the plunger 68 of a solenoid SKS so that energization of this solenoid moves bar 63 to release these keys.

Figure 14:
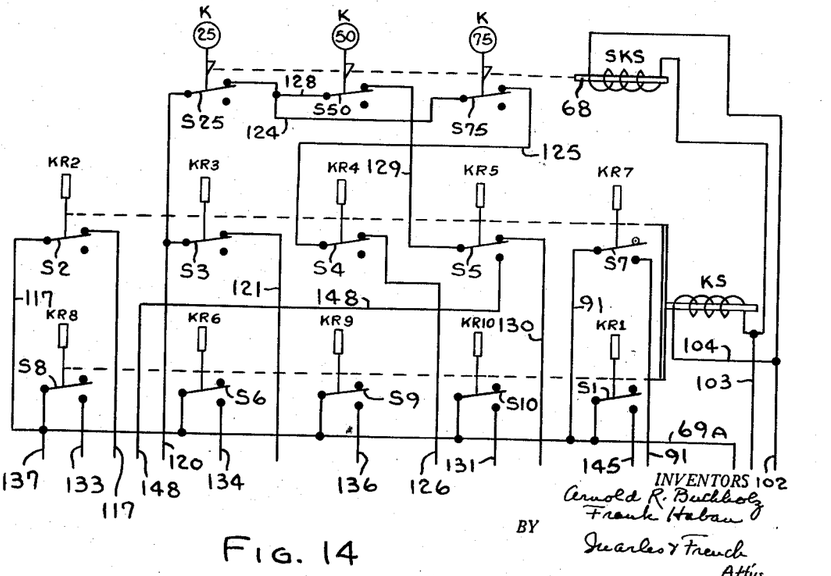
Fig. 14 is a part of a wiring diagram.
Figure 16:
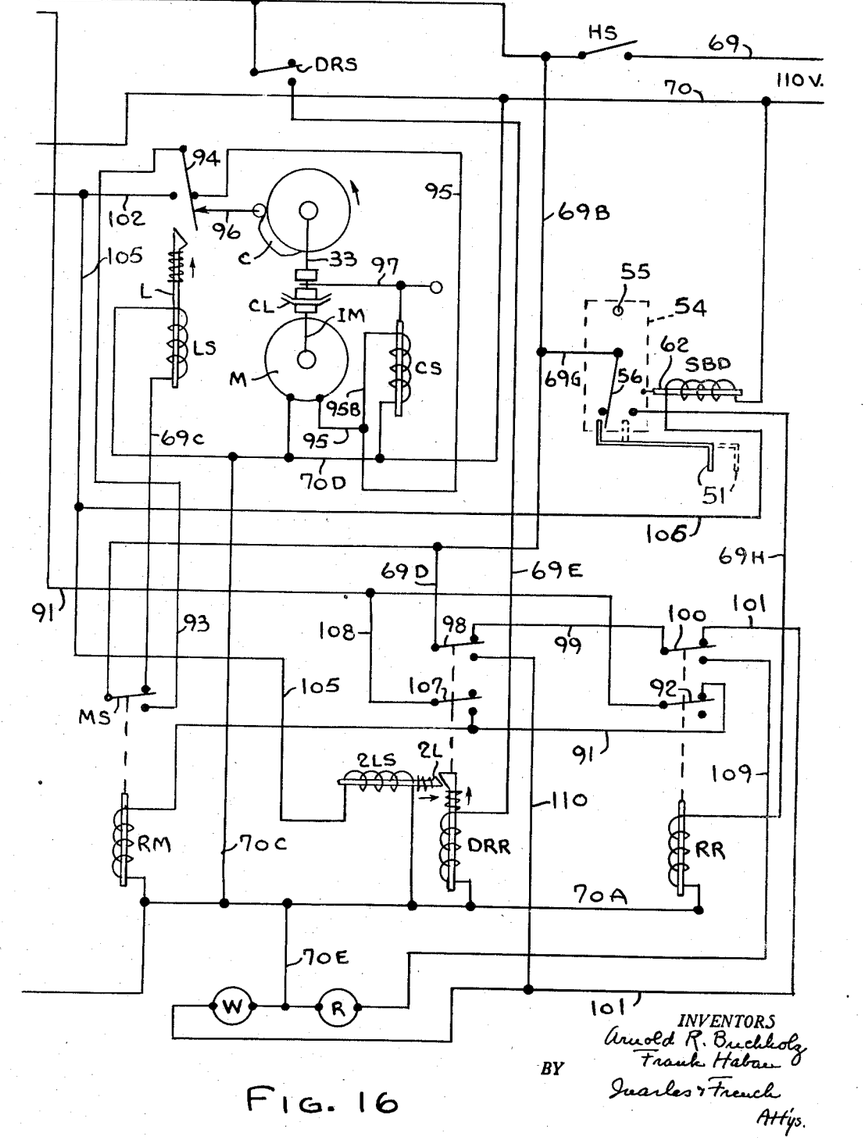
Fig. 16 is a side continuation of the diagram of Fig. 15.

Referring to Figs. 14 to 16, the numerals 69 and 69A designate a hot supply conductor and 70, 70A, and 70B ground conductors. Conductor 69 includes a hand switch HS. Conductor 70A is connected by conductors 70C and 70D to return 70. There are a series of relay R8, R6, R10, R1, R2, R3A, R3, R8A, R8B, and R5. Relay R8 controls switches 71 and 72. Relay R6 controls switches 73 and 74. Relay R10 controls switches 75, 76, 77, and 78. Relay R1 controls switches 79, 80, and 81. Relay R2, R3A, R3, R8A, respectively, control switches 82, 83, 84, and 85. Relay R8B controls switches 86, 87, and 88. Relay R5 controls switches 89 and 90.

Solenoids S1¢, S2¢, SA2¢, S5¢, S10¢, SA10¢, S25¢, and S50¢ all are connected to the ground conductor 70A and respectively control the coupling of ejector levers for coin channels A, B, C, D, E, F, G, and H.

For any operation of the machine after any of the number keys K in the digit row are depressed or any one of the tens keys with a digit key or zero key are depressed, the switch S7 is closed so that current from conductor 69A passes to a conductor 91 including switch S7, a switch 92, and the coil of relay RM to return conductor 70A, thereby shifting motor switch MS to its other position. In its initial position, switch MS in hot branch conductor 69B connects with a conductor 69C, including the coil of latch solenoid LS, conductor 70D to return 70 to hold latch L in its retracted position. Shifting switch MS to its other position deenergizes solenoid LS and current from conductor 69B now passes through switch MS, conductor 93, switch 94, conductors 95, 95A, and 95B. Conductor 95A connects with one terminal of the motor M whose other terminal is connected to a conductor 70D connected with the return 70. Conductor 95B includes the coil of clutch solenoid CS and connects with the return 70D.

As in the aforementioned application, the motor M has its shaft IM connected by a clutch CL to the shaft 33 having a cam C controlling an actuator 96 for the switch 94. The clutch CL is moved to engaging position by a lever 97 operated by the plunger of solenoid CS. Rotation of shaft 33 we have seen acts to operate any of the coupled ejectors to dispense coins from their channels. Under normal operating conditions current from conductor 69B passes through conductor 69D, switch 98 of relay DRR, conductor 99, switch 100 of relay RR, conductor 101 including the white light W, conductor 70E to return, conductor 70A lighting said light. As shaft 33 is turned by motor M, cam C moves switch 94 to its other position in which it is latched by latch L and conductor 93 is cut off from conductor 95 to break the motor circuit and deenergize solenoid CS. Current from conductor 69 now passes via conductor 69B, switch MS, conductor 93, switch 94, conductor 102 which includes the coil of relay SKS and is connected by conductor 103 to return 70. A branch conductor 104 includes the coil of relay KS so that both of these latch release solenoids KS and SKS are energized to release any of pressed down keys K or any of the special keys so that the switch S7 is opened. At the same time current from conductor 102 passes via a conductor 105 to conductor 106 including coil of relay SBD to return conductor 70 energizing this coil to release stop bar 57 from the levers 54 to relieve pressure of the actuators 52 on the fingers 51. Conductor 105 includes the coil of latch solenoid 2LS whose plunger has a normally spring pressed latch 2L that is released when switch 94 connects with conductor 102. With switch S7 opened, conductor 91 is broken and relay RM deenergized so that switch MS moves back to its original position and coil LS is again energized to release latch L from switch 94 and permit it and its actuator 96 to return to its initial position.

Relay DRR has a switch 107 disposed in a conductor 108 that bridges across parts of conductor 91 in advance of switch 92. Conductor 99 is adapted through switch 100 to connect with a conductor 109, including a red light R, and with return conductor 70E. Conductor 101 has a branch 110 adapted to connect through switch 98 with conductor 69D. The depletion release key DR controls a switch DRS in a conductor 69E that connects conductor 69 with conductor 70A and includes the coil of relay DRR. A conductor 69G is connected with all the switches, such as 56, and through such switches with a conductor 69H including the coil of relay RR. The finger 51 is shown in full in its normal position. In the event of a coin depletion finger 51 moves to its dotted line position so that the actuator 52 is released from the switch 56 which then closes connecting conductors 69G and 69H together. Now current from line 69 passes via conductors 69B, 69G, switch 56, conductor 69H including coil of relay RR to return 70A energizing said relay and shifting switches 100 and 92 to their other positions. Opening of switch 92 deenergizes relay RM so that the switch MS breaks the circuits controlling the motor M. Shifting of switch 100 to its other position connects conductor 99 with conductor 109 including red light R so that this light is lighted since switch 98 is then connecting conductor 99 with conductors 69D, 69B, and 69. If the operator depresses the depletion release key DR to close switch DRS before again operating the regular key or key K, another dispensing operation may be had. On closing switch DRS current from line 69 passes through conductor 69E to return and energizes the coil of relay DRR to shift switches 98 and 107 to their other position, relay DRR being then latched in. On shifting of switch 98 to its other position conductor 69, 69B, and 69D are connected with conductors 110 and 101 and 70E to light the white light W. On shifting of switch 107 to its other position and closing of the motor switch S7 current from conductor 91 passes via conductor 108, switch 107 to the other side of conductor 91, beyond then open switch 92, and energizes relay RM to shift switch MS to connect with conductor 93 to close the circuit to motor M and solenoid CS so that the cycle of events previously described will occur to accomplish another dispensing operation after which the solenoid 2LS will be energized to release latch 2L and allow the return of the plunger of relay DRR to its initial position so that switches 98 and 107 move back to their initial position, and since the switch 92 is still in its other position, further operation cannot be had until the coins in the depleted channel are replenished allowing switch 56 to move back to its initial position and deenergizing relay RR so that switches 100 and 92 move back to their initial positions.

The above normal cycle of events occur each time the switch S7 is closed, but the closing of this switch is preceded by the energization of any one or more of the solenoids S1¢, S2¢, SA2¢, S5¢, S10¢, SA10¢, S25¢, and S50¢. How this is accomplished will now be explained by reference to Fig. 14 and Fig. 15, and the following chart in which the "Sale" column designates the amount of the sale, on a dollar tender basis, and the columns 1 to 10 designate the rocker operated switches S1 to S10.

Chart

| Sale | 1 | 2 | 3 | 4 | 5 | 6 | 7 | 8 | 9 | 10 |
|---|---|---|---|---|---|---|---|---|---|---|
| 1 | | | | | | x | x | | x | x |
| 2 | | | | | | x | x | x | x | x |
| 3 | | | | | | x | x | | | x |
| 4 | | | | | | x | x | x | | x |
| 5 | | | | | | x | x | | | x |
| 6 | | | | | | x | x | | | x |
| 7 | | | | | | x | x | | x | x |
| 8 | | | | | | | x | x | x | |
| 9 | | | | | | x | x | | | |
| 10 | | | | | | x | x | x | | |
| 11 | | x | | | | | x | | | |
| 12 | | x | | | | x | x | | x | x |
| 13 | | x | | | | x | x | x | x | x |
| 14 | | x | | | | x | x | | | x |
| 15 | | x | | | | x | x | x | | x |
| 16 | | x | | | | | x | | | x |
| 17 | | x | | | | x | x | | x | |
| 18 | | x | | | | x | x | x | x | x |
| 19 | | x | | | | x | x | | | x |
| 20 | | x | | | | | x | x | | |
| 21 | | x | x | | | | x | | x | |
| 22 | | x | x | | | x | x | | x | x |
| 23 | | x | x | | | x | x | x | x | x |
| 24 | | x | x | | | x | x | | | x |
| 25 | | x | x | | | x | x | x | | x |
| 26 | | x | x | | | | x | | | x |
| 27 | | x | x | | | x | x | | x | |
| 28 | | x | x | | | x | x | x | x | |
| 29 | | x | x | | | x | x | | | |
| 30 | | x | x | | | | x | x | | |
| 31 | x | | | x | | | x | | x | x |
| 32 | x | | | x | | x | x | | x | x |
| 33 | x | | | x | | x | x | x | x | x |
| 34 | x | | | x | | x | x | | | x |
| 35 | x | | | x | | x | x | x | | x |
| 36 | x | | | x | | | x | | | x |
| 37 | x | | | x | | x | x | | x | |
| 38 | x | | | x | | x | x | x | x | |
| 39 | x | | | x | | x | x | | | |
| 40 | x | | | x | | | x | x | | |
| 41 | x | x | | x | | | x | | x | x |
| 42 | x | x | | x | | x | x | | x | x |
| 43 | x | x | | x | | x | x | x | x | x |
| 44 | x | x | | x | | x | x | | | x |
| 45 | x | x | | x | | x | x | x | | x |
| 46 | x | x | | x | | | x | | | x |
| 47 | x | x | | x | | x | x | | x | |
| 48 | x | x | | x | | x | x | x | x | |
| 49 | x | x | | x | | x | x | | | |
| 50 | | | | | x | | x | x | | |
| 51 | | | | | x | | x | | x | x |
| 52 | | | | | x | x | x | | x | x |
| 53 | | | | | x | x | x | x | x | x |
| 54 | | | | | x | x | x | | | x |
| 55 | | | | | x | x | x | x | | x |
| 56 | | | | | x | | x | | | x |
| 57 | | | | | x | x | x | | x | |
| 58 | | | | | x | x | x | x | x | |
| 59 | | | | | x | x | x | | | |
| 60 | | x | | | x | | x | x | | |
| 61 | | x | | | x | | x | | x | x |
| 62 | | x | | | x | x | x | | x | x |
| 63 | | x | | | x | x | x | x | x | x |
| 64 | | x | | | x | x | x | | | x |
| 65 | | x | | | x | x | x | x | | x |
| 66 | | x | | | x | | x | | | x |
| 67 | | x | | | x | x | x | | x | |
| 68 | | x | | | x | x | x | x | x | |
| 69 | | x | | | x | x | x | | | |
| 70 | | x | x | | x | | x | x | | |

Chart—Continued

| Sale | 1 | 2 | 3 | 4 | 5 | 6 | 7 | 8 | 9 | 10 |
|---|---|---|---|---|---|---|---|---|---|---|
| 71 |   | x | x |   | x | x | x |   | x | x |
| 72 |   | x | x |   | x |   | x | x | x | x |
| 73 |   | x | x |   | x | x | x |   |   | x |
| 74 |   | x | x |   | x |   | x | x |   | x |
| 75 |   | x | x |   | x |   | x |   | x |   |
| 76 |   | x | x |   | x | x | x | x | x |   |
| 77 |   | x | x |   | x | x | x |   |   |   |
| 78 |   | x | x |   | x |   | x | x |   |   |
| 79 |   | x | x |   | x |   | x |   |   |   |
| 80 | x |   |   | x | x |   | x |   | x | x |
| 81 | x |   |   | x | x | x | x |   | x | x |
| 82 | x |   |   | x | x |   | x | x | x | x |
| 83 | x |   |   | x | x | x | x |   |   | x |
| 84 | x |   |   | x | x |   | x | x |   | x |
| 85 | x |   |   | x | x |   | x |   | x |   |
| 86 | x |   |   | x | x | x | x | x | x |   |
| 87 | x |   |   | x | x | x | x |   |   |   |
| 88 | x |   |   | x | x |   | x | x |   |   |
| 89 | x |   |   | x | x |   | x |   |   |   |
| 90 | x | x |   | x | x |   | x |   | x | x |
| 91 | x | x |   | x | x | x | x |   | x | x |
| 92 | x | x |   | x | x |   | x | x | x | x |
| 93 | x | x |   | x | x | x | x |   |   | x |
| 94 | x | x |   | x | x |   | x | x |   | x |
| 95 | x | x |   | x | x |   | x |   | x |   |
| 96 | x | x |   | x | x | x | x | x | x |   |
| 97 | x | x |   | x | x | x | x |   |   |   |
| 98 | x | x |   | x | x |   | x | x |   |   |
| 99 | x | x |   | x | x |   | x |   |   |   |

We start with the fact that on closure of the hand switch HS relays S5¢, S10¢, SA10¢, S25¢, and S50¢ are energized ready to pay out a dollar.

The circuit for the S5¢ solenoid is as follows: conductors 69 and 111 including switch 89, conductor 112, conductor 113 including switch 87, conductor 114, switch 77, conductor 115, switch 81, conductor 116 including coil of relay S5¢.

The circuit for the S10¢ solenoid is as follows: conductors 69A and conductor 117 including switch S2 to switch 90, conductor 118 including coil of solenoid S10¢. Conductor 117 has a branch conductor 119 connected with ground 70 and including the coil of relay R2 so that switch 82 will be shifted to its other position. Current from conductor 111 including switch 89 passes to a conductor 120, thence through conductor 121 including switch S3, to conductor 122 including switch 85 and the coil of relay R3A to return 70B energizing said relay to shift its switch 83 to its other position so that current can now flow from conductor 122, switch 83 to conductor 123, including the coil of relay SA10¢ to return 70A. At the same time current from conductor 121 passes through conductor 132, including coil of relay R3 to return 70B to move switch 84 to its other position.

Also from conductors 69, 111, and 120 current passes to switch S25, conductor 124, switch S75, conductor 125, switch S4, conductor 126, switch 86, conductor 127 including coil of relay S25¢ to return 70A.

Also from conductors 69, 111, and 120, switch S25 and conductor 124 current passes to a branch conductor 128, switch S50, conductor 129, switch S5, conductor 130 including the coil of relay S50¢ to return 70A.

With relay R2, R3, and R3A and solenoids S5¢, S10¢, SA10¢, S25¢, S50¢ energized and a tender of one dollar given for a five cent purchase, the operator presses down on the number 5 digit key K, and according to the chart this key closes switches S10 and S7. On closure of switch S10 current from conductor 69A passes through this switch to conductor 131 including the coil of relay R10 to return to energize this relay and move switches 75, 76, 77, and 78 to their other positions. Movement of switch 77 to its other position opens the circuit to conductor 116 and solenoid S5¢ so that with the white light lighted and the latch L released and the motor and its associated parts operated on closure of switch S7 the ejectors coupled up by solenoids S10¢, SA10¢, S25¢, and S50¢ will be operated to eject ten cents each from channels E and F, a quarter from channel G and a half dollar from channel H making a total of ninety-five cents in change.

With relays R2, R3, and R3A and solenoids S5¢, S10¢, SA10¢, S25¢, S50¢ energized and a tender of one dollar given for a four cent purchase, the operator presses down on the number 4 digit key and according to the chart closes switches S8, S10, and S7. Closure of switch S10 we have seen cuts out relay S5¢ and on closure of switch S8 current from line 69A passes through this switch to conductor 133, including the coil of relay S1¢ to return so that channel A is operative to deliver one cent in addition to the 95 cents delivered from the other channels. For a three cent sale depression of the number 3 digit key closes switches S6, S7, and S10. Closure of switch S10 cuts out relay S5¢ and on closure of switch S6 current from conductor 69A passes through this switch to conductors 134 and 135, including coil of relay S2¢ to return so that channel B is operative to deliver two cents in addition to the 95 cents delivered from the other channels. For a two cent sale depression of the number 2 digit key closes switches S7, S8, S9, and S10. Closure of switches S10 and S8 we have seen delivers 96 cents and on closure of switch S9, current from conductor 69A passes through this switch to conductor 136, including coil of relay SA2¢ to return so that channel C is operative to deliver two cents in addition to the 96 cents delivered from the other channels. For a one cent sale, depression of the number 1 digit key closes switches S6, S7, S9, and S10. Closure of switch S10 cuts out relay S5¢ and closure of switches S6 and S9 energizes solenoids S2¢ and SA2¢ to deliver four cents from their associated channels in addition to the 95 cents delivered on the closure of switch S10 for a total of 99 cents. It will, therefore, be noted that for a purchase of five cents or less five cents is subtracted from the available dollar tender and 1 to 4 cents added depending upon the purchase price.

With relays R2, R3, and R3A and solenoids S5¢, S10¢, SA10¢, S25¢, and S50¢ energized and a tender of a dollar given for a purchase of 6 to 9 cents instead of cutting out solenoid S5¢ by the closing of switch S10, solenoid SA10¢ is cut out and 1 to 4 cents added to the 90 cents delivered by solenoids S5¢, S10¢, S25¢, and S50¢. Following the chart for a 6 cent purchase, switches S6, S7, and S9 are closed. Closing of switches S6 and S9 we have seen energizes solenoids S2¢ and SA2¢ to add four cents to the 90 cents. When switch S6 closes, it energizes solenoid R6 to shift switch 74 to its other position so current from line 69A passes via conductors 137, 138, switch 74, conductor 139, switch 78, conductors 140, 141, and 142 including coil of relay R8A to return to energize said relay and move switch 85 to its off position and thereby break the circuit through relay R3A and let switch 83 move back to its initial position to cut out solenoid SA10¢. For a seven cent purchase switches S7, S8, and S9 are closed so that since switches S8 and S9 energize solenoids S1¢ and SA2¢, three cents are added to the 90 cents. For an 8 cent purchase switches S6 and S7 are closed so that since switch S6 energizes solenoid S2¢ two cents are added to the 90 cents. For a 9 cent purchase switches S7 and S8 are closed so that since switch S8 energizes solenoid S1¢ one cent is added to the 90 cents for the change. It will, therefore, be noted that for a purchase of 6 to 9 cents, 10 cents is subtracted from the available dollar tender and 1 to 4 cents added depending upon the purchase price.

With relays R2, R3, and R3A and solenoids S5¢, S10¢, SA10¢, S25¢, and S50¢ energized and a tender of a dollar given for a 10 cent purchase, switch S2 is opened and switch S7 closed. Opening of switch S2 opens conductor 117 deenergizing relay R2 and also stopping current flow to conductor 118 and, therefore, deenergizing solenoid S10¢ so that solenoids S5¢, SA10¢, S25¢, and S50¢ are then operative for the delivery of 90 cents and solenoid S10¢ is cut out.

For purchases of 11 to 15 cents, solenoids S10¢ and S5¢ are cut out so that 85 cents is delivered for the 15 cent purchase and 1 to 4 cents added for the 14 to 11 cent purchases as indicated in the chart since we have seen that opening of switch S2 cuts out solenoid S10¢ and closing of switch S10 cuts out solenoids S10¢ and S5¢ and closing of switch S8 adds one cent for addition to 85 cents for 86 cents change for the 14 cent purchase, closing of switch S6 adds 2 cents for addition to pay out 87 cents change for the 13 cent purchase, closing of switches S8 and S9 adds 3 cents for addition to pay out 88 cents change for the 12 cent purchase and closing of switches S6 and S9 adds 4 cents for addition to pay out 89 cents change for the 11 cent purchase. Thus for these purchases 15 cents is subtracted from the available dollar tender and 1 to 4 cents added depending upon the purchase price.

For purchases of 16 to 19 cents, both the solenoids S10¢ and SA10¢ are cut out and solenoid S5¢ together with solenoids S25¢ and S50¢ are energized to make up 80 cents to which 1 to 4 cents are added. For these purchases the switch S2 is opened to cut out the solenoid S10¢ and closing of switches S6 and S9 adds 4 cents to make up 84 cents change for the 16 cent purchase, closing of switch S2 we have seen cuts out solenoid S10¢ and cents change for the 17 cent purchase, closing of switch S6 adds 2 cents to make up 82 cents change for the 18 cent purchase and closing of the switch S8 adds one cent to make up 81 cents change for the 19 cent purchase.

For a 20 cent purchase both solenoids S10¢ and SA10¢ are cut out since switches S2 and S3 are opened. Opening of switch S2 we have seen cuts out solenoid S10¢ and also deenergizes relay R2. Opening of switch S3 opens conductors 121 and 122 so that relay R3A is deenergized to open switch 83 and conductor 123 so that relay SA10¢ is deenergized, thereby leaving solenoids S5¢, S25¢, and S50¢ active for dispensing 80 cents change.

For purchases of 21 to 24 cents, solenoids S10¢ and SA10¢ are cut out since switches S2 and S3 are opened and since switch S10 is also closed which we have seen cuts out solenoid S5¢ only, solenoids S25¢ and S50¢ are active to deliver 75 cents to which 1 to 4 cents is added. For these purchases the closing of additional switches S6 and S9 adds 4 cents to make up 79 cents change for a 21 cent purchase, closing of additional switches S8 and S9 adds 3 cents to make up 78 cents change for a 22 cent purchase, closing of switch S6 adds 2 cents to make up 77 cents change for a 23 cent purchase and closing of switch S8 adds one cent to make up 76 cents change for a 24 cent purchase. For a 25 cent purchase only the solenoids S25¢ and S50¢ are active to deliver 25 cents in change.

For purchases of 26 to 29 cents, the solenoids S25¢ and S5¢ are cut out and 1 to 4 cents added to the dispensing of coins under the control of solenoids S10¢, SA10¢ and S50¢. On depression of the number 2 tens key and the number 6 digit key switches S2 and S3 are opened and switches S6 and S9 are closed. Closing of switches S6 and S9 we have seen energizes solenoids S2¢ and SA2¢ to dispense 4 cents and at the same time closing of switch S6 energizes relay R6 to shift switch 74 to its other position so that current from conductor 69A passes via conductors 137, 138, switch 74, conductor 139, switch 78, conductors 140, 141, and 142 including coil of relay R8A to return 70B energizing this coil to open switch 85. Opening switches S2 and S3 as in the previous examples cuts out relays R3A and R3 and with relay R3 cut out current from then live conductor 141 passes through switch 84 to conductor 142 including the coil of relay R8B to return, energizing this coil to shift switches 86, 87, and 88 to their other positions. Shifting of switch 86 to its other position cuts out solenoid S25¢ and shifting of switch 87 opens the circuit to solenoid S5¢, but shifting of the switches 87 to 89 reestablishes the circuits to solenoids S10¢ and SA10¢ since current from conductor 111 passes via conductor 112 and its closed switch 88 to conductor 118 to energize solenoid S10¢ and current from line 112 passes to conductor 112A, switch 87, conductor 143, to conductor 122 beyond switch 85 to again energize the coil of relay R3A and shift switch 83 to contact with conductor 123, including the coil of relay SA10¢ to energize this relay. Thus solenoids S5¢ and S25¢ have been cut out and 4 cents and 70 cents from relays S10¢, SA10¢, and S50¢ are dispensed to return 74 cents change. The same action takes place for sales amounts of 27 to 29 cents, the only difference being that for 27 cents purchase switch S8 is closed to energize relay R8 and solenoid S1¢ and switch S9 is closed to energize solenoid S2¢ to make up the 73 cents change, it being noted that energization of solenoid R8 shifts switch 72 to its other position to connect conductor 137 to conductor 139 through a conductor 144 and for a 28 cents purchase switch S6 is closed to energize solenoid S2¢ to make up the 72 cents change and for 29 cents the switch S8 is closed instead of switch S6 to energize solenoid S1¢ to make up the 71 cents change.

For a 30 cent purchase, switch S4 is opened and switch S1 closed. Opening of switch S4 opens the connection of conductor 126 with the hot side of the line to cut out solenoid S25¢. On closure of switch S1 current from line 69A passes through this switch to a conductor 145 including the coil of relay R1 to shift switches 79, 80, and 81 to their other positions and opening of switch 81 cuts out conductor 116 from its supply current to cut out solenoid S5¢ so that solenoids S10¢, SA10¢, and S50¢ are active for dispensing 70 cents in change. Switches S4 and S1 are used for sales of 31 to 34 cents, but from the chart it will be seen that in these cases in addition on opening switch S4 and closing switch S1 the switch S10 is also closed so that solenoid R10 is energized to shift switches 75, 76, and 77 to their other positions and relay R1 is energized to shift switches 79, 80, and 81 to their other positions. As a result, current from line 69A passes via conductors 111, 112, 112A, and 113 to branch conductors 114 and 145. From conductor 114 current then passes via switch 77, conductor 147, switch 81, conductor 116 including coil of solenoid S5¢ to keep this solenoid active. From conductor 114 current also passes via switch 76, conductor 146, switch 80, conductors 141, 142 including coil of relay R8A to return 70B energizing this relay to open switch 85 and consequently deenergize relay R3A to cut out solenoid SA10¢ so that relays S5¢, S10¢, and S50¢ are energized to permit dispensing of 65 cents to which 4 cents is added by the closure of switches S6 and S9 which we have seen energizes solenoids S2¢ and SA2¢ so that 69 cents change is dispensed for a 31 cent purchase. The dispensing of 32 to 34 cents is similar except that for 32 cents instead of closing switch S6 switch S8 is closed to dispense 1 cent, for 33 cents only switch S6 is closed to add 2 cents to the 65 cents and for 34 cents only switch S8 is closed to add 1 cent to 65 cents. For a 35 cent purchase the same action takes place, but since no pennies are added, 65 cents change is dispensed.

For purchases of 36 to 39 cents, switch S1 is closed and switch S4 opened so that solenoids S25¢ and S5¢ are cut out as previously described and the closing of either switch S6 or S8 acts as we have seen to energize relay R8A to cut out relay R3A and thus cut out solenoid SA10¢ so that only solenoids S10¢ and S50¢ are available to dispense 60 cents, the operation of switches S6, S8, and S9 according to the chart act to supply 1 to 4 cents to make up the required change of 64 to 61 cents.

For a 40 cent purchase, switch S1 is closed and switches S2 and S4 are opened. As before, opening switch S4 deenergizes solenoid S25¢ and closing of switch S1 deenergizes solenoid S5¢. Opening of switch S2 opens conductor 117 so that solenoid S10¢ is energized and, therefore, solenoids S10¢ and S50¢ are active for dispensing the 60 cents change.

For purchase amounts of 41 to 45 cents, switches S2 and S4 are opened and switches S1 and S10 are closed and 4 to 0 cents added by the selective closure of switches S6, S8, and S9 according to the chart to make up the necessary change. As before opening switch S4 deenergizes solenoid S25, closure of switches S1 and S10 cuts out solenoid SA10¢ and opening of switch S2 cuts out solenoid S10¢ so that solenoids S5¢ and S50¢ are energized for dispensing 55 cents on a 45 cent tender, and with the closure of switch S8, 56 cents for a 44 cent tender, and with the closure of switch S6, 57 cents for a 43 cent tender, and with the closure of switches S8 and S9, 58 cents for a 42 cent tender, and with the closure of switches S6 and S9, 59 cents for a 41 cent tender.

For purchase amounts of 46 to 49 cents, switches S2 and S4 are opened and switch S1 is closed and 4 to 1 cent added by the selective closure of switches S6, S8, and S9 according to the chart to make up the desired change. As before, opening switches S4 and S2 deenergizes solenoids S25¢ and S10¢ and closure of switch S1 cuts out both solenoids S5¢ and SA10¢ leaving solenoid S50¢ energized for dispensing 50 cents to which one cent is added for a 49 cent sale by closure of switch S8, 2 cents is added for a 48 cent sale by closure of switch S6, 3 cents is added for a 47 cent sale by closure of switches S8 and S9, and four cents is added for a 46 cent sale by closure of switches S6 and S9.

For a fifty cent purchase, the switch S5 is moved to its other position which cuts out all but the solenoid S50¢ to dispense 50 cents in change. On shifting of switch S5 current from conductor 69A passes via conductors 111 through switch 89 to conductors 112, 120, switch S25, conductors 124 and 128, switch S50, conductor 129, switch S5, conductor 148, switch 71, conductor 149, switch 73, conductor 150, switch 75, conductor 151, switch 79, conductor 152, switch 82 (then shifted as relay R2 is energized), conductor 153, including coil of relay R5 to return 70B, thereby energizing relay R5 to shift switches 89 and 90 to their other positions. Opening of switch 90 cuts out solenoid S10¢ and of switch 89 cuts out solenoids S5¢, SA10¢, and S25¢ but switch 89 now connects conductor 111 through branch conductor 130A with conductor 130 to energize solenoid S50¢ to dispense 50 cents in change.

For purchase amounts of 51 to 59 cents, the switch S5 is moved to its other position but cannot energize relay R5 because either switches S6, S8, or S10 will prevent the energization of relay R5 and consequently relay S50¢ will be cut out. For a 51 to 55 cent purchase, closure of switch S10 as previously noted cuts out solenoid S5¢ so that solenoids S10¢, SA10¢, and S25¢ are energized to dispense 45 cents to which 0 to 4 cents are added by selective closure of switches S6, S8, and S9 to make 45 cents change for a 55 cent purchase, 46 cents change for a 54 cent purchase, 47 cents change for a 53 cent purchase, 48 cents change for a 52 cent purchase, and 49 cents change for a 51 cent purchase. For a 56 to 59 cent purchase, the switch S10 is not operative which permits either the switch S6 or S8 to cut out solenoid SA10¢ leaving solenoids S5¢, S10¢, and S25¢ active to dispense 40 cents change to which the pennies are added by the selective operation of switches S6, S8, and S9.

For a purchase amount of 60 cents, switch S2 is opened and switch S5 moved to its other position. Opening of switch S2 deenergizes relay R2 to open switch 82. On movement of switch S5 to its other position the circuit which would ordinarily be established through switch 82 to energize relay R5 is broken and the circuit previously described to solenoid S50¢ through switch 89 is broken so that solenoid S50¢ is cut out. When the switch S2 opens, the circuit to solenoid S10¢ is open so that only solenoids S5¢, SA10¢, and S25¢ are energized to dispense 40 cents.

For purchase amounts of 61 to 65 cents, switch S2 is opened, switch S5 is moved to its other position, and switch S10 is closed. Opening of switch S2 and shifting of switch S5 cuts out solenoid S50¢ as previously described. Closing of switch S10 cuts out solenoid S5¢ as previously described and also the opening of switch S2 cuts out solenoid S10¢ as previously described, leaving solenoids SA10¢ and S25¢ active to deliver 35 cents for a 65 cent purchase and to deliver 36 cents to 39 cents for purchases of 64 to 61 cents by the addition of pennies through the selective operation of switches S6, S8, and S9 according to the chart.

For purchase amounts of 66 to 69 cents, switch S2 is opened, switch S5 moved to its other position, and either switch S6 or S8 closed. As before, movement of switch S5 to its other position cuts out solenoid S50¢ and opening of switch S2 cuts out solenoid S10¢ and the opening of either switches S6 or S8 cuts out solenoid SA10¢, leaving the solenoids S5¢ and S25¢ to dispense 30 cents, to which by the selective operation of switches S6, S8, and S9 one cent to 4 cents is added for the 69 to 66 cent purchases.

For 70 cents since switches S2 and S3 are opened and switch S5 is shifted to its other position, the solenoids S10¢, SA10¢, and S50¢ will be cut out, leaving 30 cents for the change.

For a purchase of 75 cents, the same switches are operated as in the 70 cent purchase, but in addition the switch S10 is operated to cut out solenoid S5¢ and leave solenoid S25¢ active to deliver 25 cents in change. For the amounts of 74 to 71 cents, in addition to the switches used for 75 cents there will be added 1 to 4 cents to the 25 cents change by the selective operation of the switches S6, S8, and S9.

For purchase amounts of 76 to 79 cents, switches S2 to S5 are operated to cut out the S50¢ and the S10¢ solenoids and switch S3 is operated to cut out solenoid SA10¢, and either switches S6 or S8 are energized to close the relay R6 or R8 permitting current to flow along line 69A, conductor 137, switch 72 or 74, conductor 139, switch 78, conductors 140, 141, 142 energizing relay R8A and also flow along conductor 141 to switch 84, conductor 142 to the coil of relay R8B, thereby opening switch 86 to cut out solenoid S25¢ and also relay R8B moves switch 88 to its closed position thereby allowing current from conductor 111 to flow through conductor 112 through switch 88 to solenoid S10¢ and also relay R8B shifts switch 87 to its other position allowing current to flow from conductor 112A, switch 87, conductor 143 to conductor 122 to energize relay R3A to permit current from conductor 122 to switch 83, conductor 123 to solenoid SA10¢. Shifting of relay R8B moves switch 87 to its other position and opens up the circuit to the solenoid S5¢ leaving solenoids S10¢ and SA10¢ active, so that change of 20 cents may be dispensed to which will be added 1 cent for the 79 cent purchase through the closing of switch S8, 2 cents for the 78 cent purchase through the closing of switch S6, 3 cents for the 77 cent purchase through the closing of switches S8 and S9, and 4 cents for the 76 cent purchase through the closing of switches S6 and S9.

For the 80 cent purchase, switches S1, S4, and S5 are operated. Closing of switch S1 energizes relay R1 opening the circuit of solenoid S5¢. Switch S4 opens the circuit to the S25¢ solenoid and switch S5 opens the circuit to the S50¢ solenoid because relay R1 is operated through switch S1 to open the circuit to relay R5 leaving solenoids S10¢ and SA10¢ active to dispense 20 cents.

For 81 to 85 cent purchases, switches S1, S4, S5, and S10 are all operated. Switches S1 and S10 used together keep the circuit to solenoid S5¢ operative. Switch S5 opens the circuit of the solenoid S50¢ and switch S4 takes out the solenoid S25¢. The operation of switches S1 and S10 together acts to take out the solenoid SA10¢ so that solenoids S10¢ and S5¢ are active to dispense 15 cents for an 85 cent purchase. For purchases from 81 to 84 cents, the action of switches S6, S8, and S9 adds 1 to 4 cents to the 15 cents.

For 86 to 89 cent purchases, switches S1, S4, and S5 are energized. Switch S5 takes out the solenoid S50¢, switch S4 takes out the solenoid S25¢, switch S1 used alone takes out the solenoid S5¢, and the operation of either of switches S6 to S8 according to the chart takes out the solenoid S10¢. Therefore, solenoid SA10¢ remains for dispensing 10 cents and the selective operation of switches S6, S8, and S9 adds 1 to 4 cents depending on the purchase.

For the 90 cents purchase, switches S1, S2, S4, and S5 are operated. Switch S5 takes out the solenoid S50¢, switch S4 takes out the solenoid S25¢, switch S1 takes out the solenoid S5¢, switch S2 takes out solenoid S10¢. Therefore, only solenoid SA10¢ is operative to dispense a dime.

In purchases from 91 to 95 cents switches S1, S2, S4, S5, and S10 are used. Switches S1 and S10 used together form, as previously noted, a circuit to establish solenoid S5¢ and a circuit to take out the solenoid SA10¢. Switch S2 takes out the solenoid S10¢ and switch S4 takes out solenoid S25¢ and switch S5 takes out solenoid S50¢, leaving only solenoid S5¢ active. For 91 to 94 cents, selection of switches S6, S8, and S9 will give 1 to 4 cents to make up the change of 9 to 6 cents.

For purchases from 96 to 99 cents, switches S1, S2, S4, and S5 are used. Switch S5 takes out solenoid S50¢, switch S4 solenoid S25¢, switch S1 solenoid S5¢, switch S2 solenoid S10¢, and switch S6 or S8 takes out the solenoid SA10¢. Therefore, the solenoids S5¢, S10¢, SA10¢, S25¢, and S50¢ are all deenergized and by the selection of switches S6, S8, and S9, 1 to 4 cents can be paid out for purchases of 99 to 96 cents.

The above description applies to change for purchases where a dollar has been tendered. For smaller purchases 25 cents, 50 cents, or 75 cents may be tendered. In case of a 10 cent purchase and a tender of a quarter, the special 25¢ key is pressed down and then the switch S2 is opened. As described before, closing switch S1 will normally act to keep the solenoids S50¢, S25¢, S10¢, and S5¢ active to give 85 cents in change, but since only 15 cents change is needed, depressing the special S25 key will open the circuit to solenoids S50¢ and S25¢ so that only solenoids S5¢ and S10¢ are active. For purchases of less than half a dollar on a half dollar tender, the special S50 switch is opened and then the purchase amount key K is operated. Opening switch S50 cuts out the solenoid S50¢, and if for example the purchase amount is 30 cents, solenoids S25¢ and S5¢ are cut out as previously explained on opening of switch S4 and closing of switch S1 so that solenoids S10¢ and SA10¢ are active to dispense 20 cents for change.

If the tender is 75 cents for a purchase of 65 cents, opening switch S75 will act to cut out solenoid S25¢ and opening of switch S2, movement of switch S5 to its other position, and closing switch S10 leaves only solenoid SA10¢ active to dispense 10 cents change since operation of switch S75 has taken out the solenoid S25¢ normally energized for a dollar tender.

It is also to be noted that operation of any of the special keys K25, K50, and K75 and only the zero key will act to furnish split change for 25 cents, 50 cents, and 75 cents. By opening the switch K25 circuits to solenoids S25¢ and S50¢ are cut out leaving the solenoids S5¢ S10¢, and SA10¢ active to dispense 25 cents on the operation of the zero key to close the switch S7. By opening switch K50 solenoid S50¢ is cut out leaving solenoids S5¢, S10¢, SA10¢, and S25¢ active to dispense 50 cents on the closure of switch S7. By opening switch K75 the circuit to solenoid S25¢ is cut out leaving solenoids S5¢, S10¢, SA10¢, and S50¢ active to dispense 75 cents on the closure of the switch S7.

Reference is here made to the application of Arnold R. Buchholz and William H. Sprenger for Coin Dispensing Machine, filed December 23, 1954, Serial No. 477,154, as to claims for any common subject matter relative to the keyboard herein described.

We desire it to be understood that this invention is not to be limited to any particular form or arrangement of parts except in so far as such limitations are included in the appended claims.

What we claim as our invention is:

1. In a coin dispensing apparatus having three penny channels, a five cent channel, two ten cent channels, a quarter channel, and a half dollar channel, electrically operated means to dispense a coin or coins from each channel, and an electro-responsive device for controlling the dispensing of a coin or coins from each channel by said electrically operated means, control apparatus for said devices comprising the combination of means for normally rendering all of said devices, except those for the penny channels active, to dispense coins, a keyboard having tens keys 1 to 9 and digit keys 1 to 9 and a zero key, electrically operated means controlled by said keys for selectively rendering certain of said devices for all but the penny channels inactive, and electrically operated means also controlled by said keys for selectively rendering one or more of said devices for the penny channels operative, if necessary, to make up the required change on a dollar tender basis.

2. In a coin dispensing apparatus having three penny channels, a five cent channel, two ten cent channels, a quarter channel, and a half dollar channel, electrically operated means to dispense a coin or coins from each channel, and an electro-responsive device for controlling the dispensing of a coin or coins for each channel by said electrically operated means, control apparatus for said devices comprising the combination of a closed energizing circuit for each of said devices, except those of the penny channels, a keyboard having tens keys 1 to 9 and digit keys 1 to 9, electrical circuits including relays and switches controlled by said keys for selectively opening up said closed energizing circuits, and electrical circuits also controlled by said keys for selectively energizing one or more of the devices for the penny channels, if necessary, to make up the required change on a dollar tender basis.

3. In a coin dispensing apparatus having three penny channels, a five cent channel, two ten cent channels, a quarter channel, and a half dollar channel, a coin ejector mechanism for each channel, an electro-responsive device for rendering each coin ejector mechanism operative to dispense coins, and a common electrically operated means for operating all of said coin ejector mechanisms, control apparatus for said devices comprising electrical circuits including nine switches for the control of said electro-responsive devices and a keyboard having tens keys 1 to 9, digit keys 1 to 9, and a zero key, means operable by the selective operation of said keys for operating said switches for controlling said electro-responsive devices, a switch operable by any one of said digit keys and by the zero key for controlling said common electrically operated means, means for normally rendering said electro-responsive devices for all but the penny channels active to render said coin ejector mechanisms operative to dispense coins, electrically operated means controlled by said nine switches for selectively rendering certain of said normally active electro-responsive devices inoperative, and means also controlled by certain of said nine switches for selectively rendering one or more of the electro-responsive devices for the penny channels operative, if necessary, to make up the required change.

4. In a coin changer apparatus having three penny channels, a five cent channel, two ten cent channels, a quarter channel, and a half dollar channel, a coin ejector mechanism for each channel, an electro-responsive device for rendering each coin ejector mechanism operative to dispense coins, and a common electrically operated means for operating all of said coin ejector mechanisms, control apparatus for said devices including nine switches for the control of said electro-responsive devices and a keyboard having tens keys 1 to 9, digit keys 1 to 9 and a zero key, means operable by the selective operation of said keys for operating said switches for controlling said electro-responsive devices, a switch operable by any one of said digit keys and by the zero key for controlling said common electrically operated means, means for normally rendering said electro-responsive devices for all but the penny channels active to render said coin ejector mechanisms operative to dispense coins, electrically operated means controlled by said nine switches for selectively rendering certain of said normally active electro-responsive devices inoperative, means also controlled by certain of said nine switches for selectively rendering one or more of the electro-responsive devices for the penny channels operative, if necessary, to make up the required change on a dollar tender basis, special keys 75, 50 and 25 for tenders of 75, 50 and 25 cents respectively, switches operated by said special keys and in circuit with certain of said nine switches to permit operation of only those ejector mechanisms that will give the desired change on the operation of the selected special key and said zero key.

References Cited in the file of this patent
UNITED STATES PATENTS

| | | |
|---|---|---|
| 1,007,167 | Wickline | Oct. 31, 1911 |
| 1,284,619 | Dun Lany | Nov. 12, 1918 |
| 2,605,774 | Damon et al. | Aug. 5, 1952 |

UNITED STATES PATENT OFFICE

CERTIFICATE OF CORRECTION

Patent No. 2,893,406                                                       July 7, 195

Arnold R. Buchholz et al.

It is hereby certified that error appears in the printed specification of the above numbered patent requiring correction and that the said Letters Patent should read as corrected below.

Column 3, line 58, for "sloted end" read -- slotted end --; column 4, line 53, for "A, B, C, D, E, F, G, and H" read -- A, B, C, D, E, D, F, G and H --; column 7, line 58, for "relay" read -- relays --; column 9, lines 22 and 23, for "ing of switch S2 we have seen cuts out solenoid S10¢ and cents change for the 17 cent purchase," read -- ing of switches S8 and S9 adds 3 cents to make up 83 cents change for the 17 cent purchase, --; column 12, line 33, for "S2 to S5" read -- S2 and S5 --; line 61, for "opening the circuit of solenoid S5¢" read -- opening the circuit to solenoid S5¢ --.

Signed and sealed this 5th day of April 1960.

(SEAL)
Attest:

KARL H. AXLINE
Attesting Officer

ROBERT C. WATSON
Commissioner of Patents